(12) United States Patent
Cornelius et al.

(10) Patent No.: US 7,709,406 B2
(45) Date of Patent: May 4, 2010

(54) GLASS COMPOSITIONS COMPATIBLE WITH DOWNDRAW PROCESSING AND METHODS OF MAKING AND USING THEREOF

(75) Inventors: Lauren Kay Cornelius, Painted Post, NY (US); Adam James Ellison, Painted Post, NY (US); Shari Elizabeth Koval, Beaver Dams, NY (US)

(73) Assignee: Corning Incorporation, Corning, NY (US)

( * ) Notice: Subject to any disclaimer, the term of this patent is extended or adjusted under 35 U.S.C. 154(b) by 181 days.

(21) Appl. No.: 11/888,201

(22) Filed: Jul. 31, 2007

(65) Prior Publication Data

US 2009/0036290 A1 Feb. 5, 2009

(51) Int. Cl.
C03C 3/087 (2006.01)
C03C 3/091 (2006.01)
C03C 3/085 (2006.01)
C03C 3/078 (2006.01)

(52) U.S. Cl. .............................. 501/70; 501/66; 501/69; 501/72

(58) Field of Classification Search .................. 501/66, 501/69, 70, 72
See application file for complete search history.

(56) References Cited

U.S. PATENT DOCUMENTS

| 6,319,867 | B1 * | 11/2001 | Chacon et al. | 501/66 |
| 6,537,937 | B1 * | 3/2003 | Nishizawa et al. | 501/66 |
| 6,831,029 | B2 * | 12/2004 | Chacon et al. | 501/66 |
| 6,881,692 | B2 * | 4/2005 | Murata et al. | 501/66 |
| 2002/0151426 | A1 | 10/2002 | Murata et al. | |
| 2002/0183188 | A1 * | 12/2002 | Peuchert | 501/66 |
| 2004/0220039 | A1 * | 11/2004 | Peuchert | 501/66 |
| 2006/0293162 | A1 * | 12/2006 | Ellison | 501/66 |
| 2008/0110208 | A1 * | 5/2008 | Ellison | 65/90 |

FOREIGN PATENT DOCUMENTS

| FR | 2 886 288 | 12/2006 |
| JP | 2002 029776 | 1/2002 |
| JP | 2003 192377 | 7/2003 |
| WO | WO 2007/063251 | 6/2007 |

* cited by examiner

*Primary Examiner*—Karl E Group
*Assistant Examiner*—Noah S Wiese
(74) *Attorney, Agent, or Firm*—Christopher Nicastr; Siwen Chen

(57) ABSTRACT

Described herein are alkali-free, boroalumino silicate glasses exhibiting desirable physical and chemical properties for use as substrates in flat panel display devices, such as, active matrix liquid crystal displays (AMLCDs). The glass compositions possess numerous properties that are compatible with the downdraw process, particularly fusion drawing.

17 Claims, 1 Drawing Sheet

GLASS COMPOSITIONS COMPATIBLE WITH DOWNDRAW PROCESSING AND METHODS OF MAKING AND USING THEREOF

BACKGROUND

The production of liquid crystal displays such as, for example, active matrix liquid crystal display devices (AML-CDs) is very complex, and the properties of the substrate glass are extremely important. First and foremost, the glass substrates used in the production of AMLCD devices need to have their physical dimensions tightly controlled. The downdraw sheet drawing processes and, in particular, the fusion process described in U.S. Pat. Nos. 3,338,696 and 3,682,609, both to Dockerty, are capable of producing glass sheets that can be used as substrates without requiring costly post-forming finishing operations such as lapping and polishing. Unfortunately, the fusion process places rather severe restrictions on the glass properties, which require relatively high liquidus viscosities.

In the liquid crystal display field, thin film transistors (TFTs) based on poly-crystalline silicon are preferred because of their ability to transport electrons more effectively. Poly-crystalline based silicon transistors (p-Si) are characterized as having a higher mobility than those based on amorphous-silicon based transistors (a-Si). This allows the manufacture of smaller and faster transistors, which ultimately produces brighter and faster displays.

One problem with p-Si based transistors is that their manufacture requires higher process temperatures than those employed in the manufacture of a-Si transistors. These temperatures range from 450° C. to 600° C. compared to the 350° C. peak temperatures employed in the manufacture of a-Si transistors. At these temperatures, there are several properties of the glass composition that need to be taken into consideration. For example, the coefficient of thermal expansion (CTE) should be in a range such that there is minimal distortion to silicon transistors during cool-down from the high-temperature annealing step. It is desirable to minimize the CTE of the glass composition. Other properties of the glass composition to consider include the density and Young's modulus, which contribute to the propensity of the glass sheet to sag. The sheet geometry is dictated by the particular process employed, which is beyond the control of the glass manufacturer. For fixed density, an increase in Young's modulus is desirable since it reduces the amount of sag exhibited by large glass sheets during shipping, handling and thermal processing. Likewise, any increase in density should be accompanied by a proportionate increase in Young's modulus or it will result in increased sag. Thus, glass compositions with a low CTE and high specific modulus (i.e, low density and high Young's modulus) are desirable.

Other properties of the glass composition if not in the proper range can adversely affect the glass-making process. For example, if the glass has 200 poise temperature that is very high, this creates a problem for premelt refractories and possible erosion of Pt/Rh in the finer. If the glass has a high stir, the formation of Pt inclusions in the glass are possible. Additionally, if the delivery temperature of the glass is high, this can present a problem for isopipe corrosion and sag. Finally, the use of chemical fining agents are needed to control liquidus temperature, liquidus viscosity and liquidus phase (cristobalite) for the fusion draw process. However, chemical fining agents are limited in their ability to control these properties. Moreover, chemical fining agents such as, for example, arsenic, are generally not preferred in the glass-making process due to environmental concerns.

Described herein are alkali-free glasses and methods for making the same that possess a number of desirable properties required for downdraw processing, which is important in the manufacturing of substrates for liquid crystal displays.

SUMMARY

In accordance with the purposes of the disclosed materials, compounds, compositions, articles, devices, and methods, as embodied and broadly described herein are alkali-free, boroalumino silicate glasses exhibiting desirable physical and chemical properties for use as substrates in flat panel display devices, such as, active matrix liquid crystal displays (AMLCDs). The glass compositions possess numerous properties that are compatible with the downdraw processing. Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying figures, which are incorporated in and constitute a part of this specification, illustrate several aspects described below.

DETAILED DESCRIPTION

Figure 1:
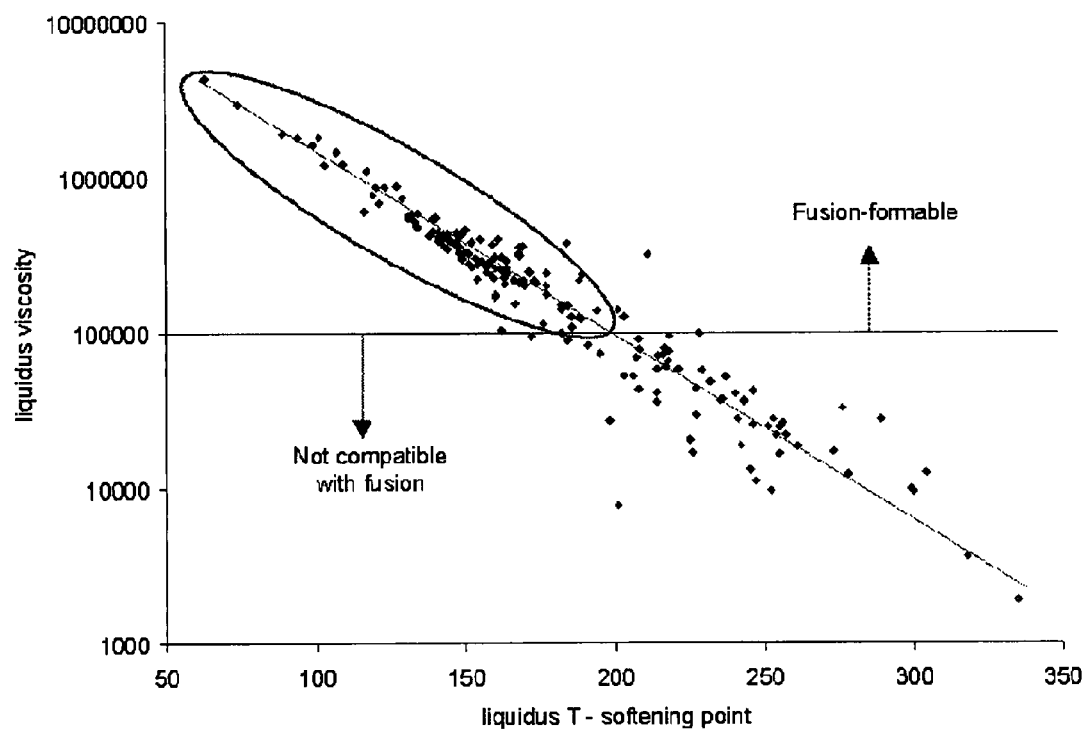
FIG. 1 is a plot of liquidus viscosity vs. liquidus temperature minus softening point for a wide range of LCD-type glasses.

The materials, compounds, compositions, articles, devices, and methods described herein may be understood more readily by reference to the following detailed description of specific aspects of the disclosed subject matter and the Examples included therein and to the Figures.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the layer" includes mixtures of two or more such layers, and the like. "Optional" or "optionally" means that the subsequently described event or circumstance can or cannot occur, and that the description includes instances where the event or circumstance occurs and instances where it does not.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers or prepared by methods known to those skilled in the art.

Reference will now be made in detail to specific aspects of the disclosed materials, compounds, compositions, articles, and methods, examples of which are illustrated in the accompanying Examples and Figures.

Described herein are alkali-free glasses and methods for making the same that possess properties compatible with downdraw (e.g., fusion) processes.

In one aspect the composition comprises an alkali-free glass comprising in mole percent on an oxide basis:

| | |
|---|---|
| $SiO_2$ | 67.0-70.0 |
| $B_2O_3$ | 8.0-11.0 |
| $Al_2O_3$ | 9.5-12.0 |
| MgO | <3.7 |
| CaO | 5.5-11.2 |
| SrO | ≦2.2 |
| BaO | ≦2.2 |
| MgO/CaO | ≦0.7 | wherein:
(a) $1.0 \leq \Sigma(MgO+CaO+SrO+BaO)/(Al_2O_3) \leq 1.25$, where $Al_2O_3$, MgO, CaO, SrO, and BaO represent the mole percents of the representative oxide components;
(b) 2.5 MgO+5 CaO+6 SrO+7 BaO≦59;
(c) the glass has a coefficient of thermal expansion less than or equal to $36 \times 10^{-7}/°C$ over the temperature range of 0 to 300° C.;
(d) the glass has a density less than or equal to 2.46 g/cc; and
(e) the glass has a liquidus temperature minus softening point up to 200° C.

To be formed by a downdraw process, in particular the fusion process, the temperature at which crystals first appear in the molten glass is preferably maintained at as high a viscosity as reasonably possible. In one aspect, the viscosity is at least 85 kilopoise (Kpoise), or greater than 100 Kpoise. It has been discovered that the difference between the gradient boat liquidus and softening point is an accurate gauge of liquidus viscosity for AMLCD-type glasses. For example, FIG. 1 is a plot of liquidus viscosity vs. liquidus temperature minus softening point for a wide range of LCD-type glasses, which shows that when liquidus temperature minus softening point is less than or equal to 200° C., the liquidus viscosity is greater than 100 Kpoise. Therefore, in one aspect, a compatible glass for sheet formation via a downdraw process has a liquidus temperature minus softening point not greater than 200° C., or from 90° C. to 200° C. In another aspect, the glass composition has a liquidus temperature less than or equal to 1,200° C., or from 1,060° C. to 1,200° C. As shown in FIG. 1, lower values of liquidus temperature minus softening point correspond to higher liquidus viscosities. Thus, keeping liquidus temperature minus softening point as low as reasonably possible facilitates the production of glass sheets useful in LCD applications.

Two additional features the glass compositions described herein possess include relatively low coefficients of thermal expansion (CTE) and elevated specific moduli. In one aspect, the CTE is less than or equal to $36 \times 10^{-7}/°C$ over the temperature range of 0 to 300° C. In another aspect, the CTE is $30 \times 10^{-17}/°C \leq CTE \leq 36 \times 10^{-7}/°C$ over the temperature range of 0 to 300° C.

During the processing of displays, glass sheets are often held only at opposite edges, and therefore experience sagging in the unsupported central portion of the sheet. The amount of sag is a function of the geometry of the sheet, the density, and Young's modulus of the glass, which together can be expressed as the specific modulus. The sheet geometry is dictated by the particular process employed, which is beyond the control of the glass manufacturer. For fixed density, an increase in Young's modulus is desirable since it reduces the amount of sag exhibited by large glass sheets during shipping, handling and thermal processing. Likewise, any increase in density should be accompanied by a proportionate increase in Young's modulus or it will result in increased sag. In one aspect, the glass has a density of less than or equal to 2.46 grams/cc. In another aspect, the glass has a density from 2.37 g/cc to 2.46 grams/cc. In a further aspect, the glass has a Young's modulus from 10 Mpsi to 11.0 Mpsi, or from 10.4 Mpsi to 10.8 Mpsi.

The glass compositions described herein also possess high strain points. A high strain point is desirable to help prevent panel distortion due to compaction/shrinkage during thermal processing subsequent to manufacturing of the glass. In one aspect, the glass compositions described herein have a strain point greater than or equal to 650° C. or from 650° C. to 695° C. In a further aspect, the glass compositions described herein have a thermal compaction less than 30 ppm, less than 25 ppm, less than 20 ppm, less than 15 ppm, or less than 10 ppm.

Each of the components used to prepare the glass compositions described herein is discussed next. In the glass compositions, $SiO_2$ serves as the basic glass former. In certain aspects, the concentration of $SiO_2$ can be greater than 67 mole percent in order to provide the glass with a density and chemical durability suitable for a flat panel display glass (e.g., an AMLCD glass), and a liquidus temperature (liquidus viscosity), which allows the glass to be formed by a downdraw process (e.g., a fusion process). In terms of an upper limit, in general, the $SiO_2$ concentration is be less than or equal to about 70 mole percent to allow batch materials to be melted using conventional, high volume, melting techniques, e.g., Joule melting in a refractory melter. As the concentration of $SiO_2$ increases, the 200 poise temperature (melting temperature) generally rises. In various applications, the $SiO_2$ concentration is adjusted so that the glass composition has a melting temperature less than or equal to 1,650° C.

$Al_2O_3$ is another glass former used to make the glass composition. Its concentration is determined by the total concentration of $SiO_2+B_2O_3$ and the desired $RO/Al_2O_3$ ratio. In practical terms, the $Al_2O_3$ concentration of the glass is from about 9.5 to about 12 mole percent. Such levels are required to provide adequate viscosity at the liquidus temperature to obtain a liquidus viscosity compatible with fusion. The use of at least 9.5 mole percent $Al_2O_3$ also improves the glass' strain point and modulus. In order to achieve an $\Sigma[RO]/[Al_2O_3]$ ratio greater than or equal to 1, the $Al_2O_3$ concentration is kept below 12.0 mole percent, or between 9.5 and 11.5 mole percent.

$B_2O_3$ is both a glass former and a flux that aids melting and lowers the melting temperature. To achieve these effects, the glass compositions have $B_2O_3$ concentrations that are equal to or greater than 8.0 mole percent. Large amounts of $B_2O_3$, however, lead to reductions in strain point (approximately 14° C. for each mole percent increase in $B_2O_3$ above 8 mole percent), modulus, and chemical durability. In one aspect, $B_2O_3$ concentration is between 8.0 and 11.0 mole percent, or between 8.5 and 10.5 mole percent.

The $Al_2O_3$ and $B_2O_3$ concentrations can be manipulated to achieve the desired strain point, modulus, durability, density, and CTE while maintaining the melting and forming properties of the glass. For example, an increase in $B_2O_3$ and a corresponding decrease in $Al_2O_3$ can lower the density and CTE, while an increase in $Al_2O_3$ and a corresponding decrease in $B_2O_3$ can increase strain point, modulus, and durability, provided that the increase in $Al_2O_3$ does not reduce the $\Sigma[RO]/[Al_2O_3]$ ratio below 1.

In addition to the glass formers ($SiO_2$, $Al_2O_3$, and $B_2O_3$), the glass compositions also include at least two alkaline earth oxides. In one aspect, the at least two alkaline earth oxides include MgO and CaO, and, optionally, SrO and/or BaO. The alkaline earth oxides provide the glass with various properties important to melting, fining, forming, and ultimate use. The MgO concentration in the glass and the glass' $\Sigma[RO]/[Al_2O_3]$ ratio, where $[Al_2O_3]$ is the mole percent of $Al_2O_3$ and $\Sigma[RO]$ equals the sum of the mole percents of MgO, CaO, SrO, and BaO, can strongly influence glass performance (e.g., meltability and fining). An increase in MgO concentration also increases the $RO/Al_2O_3$ ratio greater than 1.0, which contributes to the production of bubble-free glass. In one aspect, the $RO/Al_2O_3$ ratio is greater than or equal to one and less than or equal to 1.25. Relative to the other alkaline earth oxides, the presence of MgO results in lower density and CTE, and a higher chemical durability, strain point, and modulus. In one aspect, the MgO concentration is greater than or equal to 1.0 mole percent and less than 3.7 mole percent.

Of the alkaline earth oxides, the CaO concentration in the glass composition is generally the highest. The presence of CaO produces low liquidus temperatures (high liquidus viscosities), high strain points and moduli, and CTEs in the most desired ranges for flat panel applications (e.g., AMLCD applications). Compared to similar levels of SrO or BaO, CaO also contributes favorably to chemical durability and is relatively inexpensive as a batch material. In one aspect, The CaO concentration is greater than or equal to 5.5 mole percent to achieve these desirable traits. At high concentrations, however, CaO increases density and CTE relative to the major glass forming oxides and MgO. Therefore, in one aspect, the CaO concentration of the glasses of the invention is less than or equal to 11.2 mole percent.

MgO and CaO work together to produce ideal physical and rheologic properties for alkali-free AMLCD substrates. In certain aspects, once the MgO concentration is high enough, and the CaO concentration low enough, mullite appears as a liquidus phase, and liquidus temperatures increase very rapidly with further increases in MgO concentration. Therefore, in one aspect, the molar ratio of MgO/CaO is less than or equal to 0.7 to avoid mullite as a liquidus phase.

The remaining alkaline earth oxides SrO and BaO can both contribute to low liquidus temperatures (high liquidus viscosities). Thus, in certain aspects, the glass compositions will contain at least one of these oxides. Relative to MgO or CaO, both SrO and BaO increase CTE and density and lower the modulus and strain point. Of the two, BaO generally has more adverse effects on glass properties than SrO, but has a much greater impact on liquidus temperature, and hence on liquidus viscosity. In one aspect, SrO and BaO can be present to a level of up to 2.2 mole percent without altering the physical properties outside of the desired ranges discussed above. In another aspect, both SrO and BaO can be present at a combined level of up to 2.7 mole percent without compromising physical properties and manufacturing characteristics. These elevated concentrations can aid in obtaining a sufficiently high liquidus viscosity so that the glass can be formed by a downdraw process.

The interplay between the alkaline earth oxides produces very complex liquidus and physical property dependencies. In one aspect, when $B_2O_3$, $SiO_2$ and $RO/Al_2O_3$ are within the ranges described above, the amount of alkaline earth oxides can be expressed by the following:

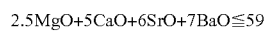

$$2.5MgO + 5CaO + 6SrO + 7BaO \leq 59$$

where the oxides are in mole percent. This weighting is in accordance with the impact of these oxides on physical properties. As an example, BaO is given a high weight because it contributes greatly to CTE and density, while the low weight for MgO reflects is comparatively benign or advantageous impact on these attributes.

In addition to the above components, the glass compositions described herein can include other oxides to adjust various physical, melting, fining, and forming attributes of the glasses. Examples of such other oxides include, but are not limited to, $TiO_2$, MnO, ZnO, $Nb_2O_5$, $MoO_3$, $Ta_2O_5$, $WO_3$, $Y_2O_3$, $La_2O_3$, $CeO_2$, or any combination thereof. In one aspect, the amount of each of these oxides is less than or equal to 2.0 mole percent, and their total combined concentration is less than or equal to 5.0 mole percent. The glass compositions can also include various contaminants associated with batch materials and/or introduced into the glass by the melting, fining, and/or forming equipment used to produce the glass, such as, $Fe_2O_3$ and $ZrO_2$. The glasses can also contain $SnO_2$ either as a result of Joule melting using tin-oxide electrodes and/or through the batching of tin containing materials, e.g., $SnO_2$, SnO, $SnCO_3$, $SnC_2O_4$, etc.

The glass compositions are generally alkali free; however, the glass can also contain some alkali contaminants. However, for AMLCD applications, the alkali levels should be kept below 0.1 mole percent to avoid having a negative impact on thin film transistor (TFT) performance through diffusion of alkali ions from the glass into the silicon of the TFT. As used herein, an "alkali-free glass" is a glass having a total alkali concentration that is less than or equal to 0.1 mole percent, where the total alkali concentration is the sum of the $Na_2O$, $K_2O$, and $Li_2O$ concentrations. Preferably, the total alkali concentration is less than or equal to 0.07 mole percent.

As discussed above, in accordance with the invention, it has been found that having an $\Sigma[RO]/[Al_2O_3]$ ratio greater than or equal to one improves fining (i.e., the removal of gaseous inclusions from the melted batch materials). This improvement allows for the use of more environmentally friendly fining packages. For example, on an oxide basis, the glass compositions can have one or more of the following compositional characteristics:

(i) an $As_2O_3$ concentration of at most 0.05 mole percent;
(ii) an $Sb_2O_3$ concentration of at most 0.05 mole percent; and/or
(iii) a $SnO_2$ concentration of at least 0.01 mole percent.

$As_2O_3$ is the most effective high-temperature fining agent for AMLCD glasses, and in certain aspects, $As_2O_3$ may be used for fining because of its superior fining properties. In addition, if a melting system includes a region in which glass is in direct contact with platinum or alloys of platinum, and if the interface on the outside of the platinum comprises air or moist air, then hydrogen can pass through the platinum at high temperature to the air interface, leaving behind an oxygen-rich bubble. $As_2O_3$ is exceptionally good at consuming the oxygen in the bubble more or less at the rate that it is generated, thereby eliminating gaseous defects from the final glass. However, $As_2O_3$ is poisonous and thus requires special handling during the glass manufacturing process. When added to a base glass, $As_2O_3$ typically increases liquidus temperature, and therefore its use to control defects must be balanced against its impact on liquidus viscosity. Accordingly, in one aspect, fining is performed without the use of substantial amounts of $As_2O_3$, i.e., the finished glass has at most 0.05 mole percent $As_2O_3$. Preferably, no $As_2O_3$ is intentionally added to the glass. In this aspect, the finished glass will typically have at most 0.005 mole percent $As_2O_3$ as a result of contaminants present in the batch materials and/or the equipment used to melt the batch materials.

$Sb_2O_3$ contributes to fining and to suppression of oxygen-rich bubbles at glass-Pt interfaces. It is considerably less effective than arsenic in both regards. Thus, higher concentrations are typically required to obtain the same impact as $As_2O_3$. Although not as toxic as $As_2O_3$, $Sb_2O_3$ is also poisonous and requires special handling. In addition, $Sb_2O_3$ raises the density, raises the CTE, and lowers the strain point in comparison to glasses that use $As_2O_3$ or $SnO_2$ as a fining agent. For $Sb_2O_3$ to be used at an appreciable concentration in a given composition, the BaO concentration is reduced by one mole percent per mole percent $Sb_2O_3$, or the SrO concentration is reduced by 1.5 mole percent per mole percent $Sb_2O_3$, in order to keep physical properties within the ranges described above. The impact of $Sb_2O_3$ on viscoelastic properties is similar to $B_2O_3$ in that it lowers viscosity at all temperatures. However, $Sb_2O_3$ can decrease the stability of aluminosilicate crystals, and thereby extend the cristobalite liquidus to lower $SiO_2$ contents. This can be a desirable outcome for improving liquidus viscosity. If $Sb_2O_3$ is to be used as a fining agent or as a means to suppress blister formation in the platinum system, then its concentration is preferably kept below 0.4 mole percent, more preferably at or below 0.3 mole percent.

In certain preferred embodiments, fining is performed without the use of substantial amounts of $Sb_2O_3$, i.e., the finished glass has at most 0.05 mole percent $Sb_2O_3$. Preferably, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is still less effective, and its ability to absorb oxygen produced by hydrogen permeation is still more circumscribed; however, $SnO_2$ is a ubiquitous material which has no known hazardous properties. Additionally, for many years, $SnO_2$ has been a component of AMLCD glasses through the use of tin oxide electrodes in the Joule melting of the batch materials for such glasses. The presence of $SnO_2$ in AMLCD glasses has not resulted in any known adverse effects when the glass is used to manufacture liquid crystal displays. $SnO_2$, however, can form crystalline defects in AMLCD glasses when used at high concentrations. Accordingly, the concentration of $SnO_2$ in the finished glass is preferably less than or equal to 0.15 mole percent.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. In other aspects, these other fining techniques can be used alone or in any combination without the use of tin fining. Likewise, addition of $SnO_2$ may permit reduction of $As_2O_3$ and/or $Sb_2O_3$, thus resulting in a more environmentally friendly glass. In all of these cases, maintaining an $\Sigma[RO]/[Al_2O_3]$ ratio, MgO concentration, and MgO/CaO ratios within the ranges discussed above makes the fining process easier to perform and more effective.

The glasses described herein can be manufactured using various techniques known in the art. In one aspect, the glasses are made using a downdraw process such as, for example, a fusion downdraw process. In one aspect, described herein is a method for producing an alkali-free glass sheet by a downdraw process comprising selecting, melting, and fining batch materials so that the glass making up the sheets comprises $SiO_2$, $Al_2O_3$, $B_2O_3$, MgO, CaO and BaO, and, on an oxide basis, comprises:

| | |
|---|---|
| $SiO_2$ | 67.0-70.0 |
| $B_2O_3$ | 8.0-11.0 |
| $Al_2O_3$ | 9.5-12.0 |
| MgO | <3.7 |
| CaO | 5.5-11.2 |
| SrO | $\leq 2.2$ |
| BaO | $\leq 2.2$ |
| MgO/CaO | $\leq 0.7$ | wherein:
(a) $1.0 \leq \Sigma(MgO+CaO+SrO+BaO)/(Al_2O_3) \leq 1.25$, where $Al_2O_3$, MgO, CaO, SrO, and BaO represent the mole percents of the representative oxide components;
(b) 2.5 MgO+5 CaO+6 SrO+7 BaO$\leq$59; and
(c) the fining is performed without the use of substantial amounts of either arsenic or antimony; and
(d) a population of 50 sequential glass sheets produced by the downdraw process from the melted and fined batch materials comprising an average gaseous inclusion level of less than 0.10 gaseous inclusions/cubic centimeter, where each sheet in the population has a volume of at least 500 cubic centimeters.

In one aspect, the population of 50 sequential glass sheets produced by the downdraw process from the melted and fined batch materials has an average gaseous inclusion level of less than 0.05 gaseous inclusions/cubic centimeter, where each sheet in the population has a volume of at least 500 cubic centimeters.

The downdraw sheet drawing processes and, in particular, the fusion process described in U.S. Pat. Nos. 3,338,696 and 3,682,609 both to Dockerty, which are incorporated by reference, can be used herein. Compared to other forming processes, such as the float process, the fusion process is preferred for several reasons. First, glass substrates made from the fusion process do not require polishing. Current glass substrate polishing is capable of producing glass substrates having an average surface roughness greater than about 0.5 nm (Ra), as measured by atomic force microscopy. The glass substrates produced by the fusion process have an average surface roughness as measured by atomic force microscopy of less than 0.5 nm. The substrates also have an average internal stress as measured by optical retardation which is less than or equal to 150 psi. The glass compositions described herein can be used to make various glass articles. For example, the glass compositions described herein can be used to make substrates for liquid crystal displays such as, for example, AMLCDs.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in °C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

Preparation of a Test Sample

Test glass samples are made by melting appropriate batch materials in Pt crucibles at 1,600-1,650° C. for 6 or more hours, and pouring onto a steel sheet, followed by annealing at approximately 720° C. The glass properties in Table 1 were determined in accordance with techniques conventional in the glass art. Thus, the linear coefficient of thermal expansion (CTE) over the temperature range 0-300° C. (expressed in terms of $\times 10^{-7}$/° C.) and the strain point (expressed in terms of ° C.) were determined from fiber elongation techniques (ASTM references E228-85 and C336, respectively). The density in terms of grams/cm³ was measured via the Archimedes method (ASTM C693). When reported, the melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81). The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The liquidus viscosity in poises was determined from the liquidus temperature and the coefficients of the Fulcher equation. Young's modulus values in terms of Mpsi were determined using a resonant ultrasonic spectroscopy technique of the general type set forth in ASTM E1875-00e1.

Throughout this application, various publications are referenced. The disclosures of these publications in their entireties are hereby incorporated by reference into this application in order to more fully describe the compounds, compositions and methods described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. An alkali metal-free glass comprising in mole percent on an oxide basis:

| | |
|---|---|
| $SiO_2$ | 67.0-70.0 |
| $B_2O_3$ | 8.0-11.0 |
| $Al_2O_3$ | 9.5-12.0 |
| MgO | <3.7 |
| CaO | 5.5-11.2 |
| SrO | ≦2.2 |
| BaO | ≦2.2 |
| MgO/CaO | ≦0.7 | wherein:
 (a) $1.0 \leq \Sigma(MgO+CaO+SrO+BaO)/(Al_2O_3) \leq 1.25$, where $Al_2O_3$, MgO, CaO, SrO, and BaO represent the mole percents of the representative oxide components;
 (b) 2.5 MgO+5 CaO+6 SrO+7 BaO≦59;
 (c) the glass has a coefficient of thermal expansion less than or equal to $36 \times 10^{-7}$/° C. over the temperature range of 0 to 300° C.;
 (d) the glass has a density less than or equal to 2.46 g/cc;
 (e) the glass has a liquidus temperature minus softening point up to 200° C.; and
 (f) the glass comprises at most 0.05 mole percent of $As_2O_3$ and at most 0.05 mole percent of $Sb_2O_3$.

2. The glass of claim 1, wherein the glass has a linear coefficient of thermal expansion (CTE) of $30 \times 10^{-7}$/° C.≦CTE≦$36 \times 10^{-7}$/° C. over the temperature range of 0 to 300° C.

3. The glass of claim 1, wherein the glass has a density of from 2.37 g/cc to 2.46 g/cc.

4. The glass of claim 1, wherein the glass has a liquidus temperature minus softening point from 90° C. to 200° C.

5. The glass of claim 1, wherein the glass has a strain point greater than 650° C.

6. The glass of claim 1, wherein the glass has a strain point from 650° C. to 695° C.

7. The glass of claim 1, wherein the glass has a Young's modulus from 10 Mpsi to 11.0 Mpsi.

8. The glass of claim 1, wherein the glass has a Young's modulus from 10.4 Mpsi to 10.8 Mpsi.

9. The glass of claim 1, wherein the glass has a liquidus temperature from 1,060° C. to 1,200° C.

10. The glass of claim 1, wherein the glass has a viscosity at the liquidus temperature minus softening point greater than 100 kpoise.

11. The glass of claim 1, wherein the amount of $B_2O_3$ present in the glass composition is from 8.5 to 10.5 mole percent.

12. The glass of claim 1, wherein the amount of $Al_2O_3$ present in the glass composition is from 9.5 to 11.5 mole percent.

13. The glass of claim 1, wherein the amount of MgO present in the glass composition is from 1.0 to 3.7 mole percent.

14. The glass of claim 1, where in the glass further comprises $TiO_2$, MnO, ZnO, $Nb_2O_5$, $MoO_3$, $Ta_2O_5$, $WO_3$, $Y_2O_3$, $La_2O_3$, $CeO_2$, or any combination thereof, wherein the amount of each oxide is less than or equal to 2.0 mole percent.

15. The glass of claim 1, wherein the glass comprises the following properties:

(a) the glass has a coefficient of thermal expansion from 30 to $36 \times 10^{-7}/°$ C. over the temperature range of 0 to 300° C.;

(b) the glass has a strain point from 650° C. to 695° C.;

(c) the glass has a density of from 2.37 g/cc to 2.46 g/cc;

(d) the glass has a Young's modulus from 10.4 Mpsi to 10.8 Mpsi;

(e) the glass has a liquidus temperature from 1,060° C. to 1,200° C.; and (f) the glass has a liquidus temperature minus softening point from 90° C. to 200° C.

16. An alkali metal-free glass comprising in mole percent on an oxide basis:

| | |
|---|---|
| $SiO_2$ | 67.0-70.0 |
| $B_2O_3$ | 8.0-11.0 |
| $Al_2O_3$ | 9.5-12.0 |
| MgO | 1.0-<3.7 |
| CaO | 5.5-11.2 |
| SrO | ≤2.2 |
| BaO | ≤2.2 |
| MgO/CaO | ≤0.7 | wherein:

(a) $1.0 \leq \Sigma(MgO+CaO+SrO+BaO)/(Al_2O_3) \leq 1.25$, where $Al_2O_3$, MgO, CaO, SrO, and BaO represent the mole percents of the representative oxide components;

(b) 2.5 MgO+5 CaO+6 SrO+7 BaO≤59;

(c) the glass has a coefficient of thermal expansion less than or equal to $36 \times 10^{-7}/°$ C. over the temperature range of 0 to 300° C.;

(d) the glass has a density less than or equal to 2.46 g/cc; and (e) the glass has a liquidus temperature minus softening point up to 200° C.

17. The glass of claim 16, which comprises at most 0.05 mole percent of $As_2O_3$ and at most 0.05 mole percent of $Sb_2O_3$.

* * * * *

UNITED STATES PATENT AND TRADEMARK OFFICE
CERTIFICATE OF CORRECTION

PATENT NO. : 7,709,406 B2 Page 1 of 1
APPLICATION NO. : 11/888201
DATED : May 4, 2010
INVENTOR(S) : Lauren Kay Cornelius et al.

It is certified that error appears in the above-identified patent and that said Letters Patent is hereby corrected as shown below:

Title Page, item (73) Assignee   Should be changed to read:

(73) Assignee: Corning Incorporated, Corning, NY (US)

Signed and Sealed this

Thirty-first Day of August, 2010

David J. Kappos
*Director of the United States Patent and Trademark Office*